US 9,727,388 B2

(12) United States Patent
Jahagirdar et al.

(10) Patent No.: US 9,727,388 B2
(45) Date of Patent: Aug. 8, 2017

(54) MIGRATING THREADS BETWEEN ASYMMETRIC CORES IN A MULTIPLE CORE PROCESSOR

(75) Inventors: Sanjeev S. Jahagirdar, Folsom, CA (US); Varghese George, Folsom, CA (US); Inder Sodhi, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 101 days.

(21) Appl. No.: 13/995,340

(22) PCT Filed: Dec. 29, 2011

(86) PCT No.: PCT/US2011/067778
§ 371 (c)(1),
(2), (4) Date: Jun. 18, 2013

(87) PCT Pub. No.: WO2013/101032
PCT Pub. Date: Jul. 4, 2013

(65) Prior Publication Data
US 2014/0026146 A1    Jan. 23, 2014

(51) Int. Cl.
*G06F 9/50* (2006.01)
*G06F 9/30* (2006.01)
*G06F 9/48* (2006.01)

(52) U.S. Cl.
CPC ........ *G06F 9/5083* (2013.01); *G06F 9/30003* (2013.01); *G06F 9/4856* (2013.01)

(58) Field of Classification Search
None
See application file for complete search history.

(56) References Cited

U.S. PATENT DOCUMENTS

| 4,763,242 | A  | * | 8/1988  | Lee et al. ........................ 703/27 |
| 6,501,999 | B1 | * | 12/2002 | Cai ................................ 700/82 |
| 7,925,923 | B1 | * | 4/2011  | Hyser et al. .................... 714/13 |
| 8,006,077 | B2 |   | 8/2011  | Li et al. |
| 8,418,187 | B2 | * | 4/2013  | Greenhalgh .......... G06F 1/3293 |
|           |    |   |         | 712/228 |

(Continued)

OTHER PUBLICATIONS

Hewlett-Packard, Advanced Configuration and Power Interface Specification, Revision 4.0a, Apr. 5, 2010, sections 5.2.12, 5.2.16, 5.2.17, and 8.3.*
PCT International Search Report for PCT Counterpart Application No. PCT/US2011/067778, 3 pgs., (Sep. 26, 2012).
PCT Written Opinion of the International Searching Authority for PCT Counterpart Application No. PCT/US2011/067778, 4 pgs., (Sep. 26, 2012).

(Continued)

*Primary Examiner* — Lewis A Bullock, Jr.
*Assistant Examiner* — Bruce S Ashley
(74) *Attorney, Agent, or Firm* — Nicholson De Vos Webster & Elliott LLP

(57) ABSTRACT

Some implementations provide techniques and arrangements to migrate threads from a first core of a processor to a second core of the processor. For example, some implementations may identify one or more threads scheduled for execution at a processor. The processor may include a plurality of cores, including a first core having a first characteristic and a second core have a second characteristic that is different than the first characteristic. Execution of the one or more threads by the first core may be initiated. A determination may be made whether to apply a migration policy. In response to determining to apply the migration policy, migration of the one or more threads from the first core to the second core may be initiated.

16 Claims, 8 Drawing Sheets

(56) References Cited

U.S. PATENT DOCUMENTS

| | | | |
|---|---|---|---|
| 8,561,073 B2* | 10/2013 | Gopalan et al. | 718/102 |
| 2005/0013705 A1* | 1/2005 | Farkas et al. | 417/393 |
| 2006/0095807 A1* | 5/2006 | Grochowski et al. | 713/324 |
| 2008/0115010 A1* | 5/2008 | Rothman et al. | 714/10 |
| 2008/0263324 A1* | 10/2008 | Sutardja | G06F 1/3203 712/43 |
| 2009/0037911 A1* | 2/2009 | Ahuja | G06F 9/5044 718/100 |
| 2009/0172424 A1 | 7/2009 | Cai et al. | |
| 2009/0222654 A1* | 9/2009 | Hum et al. | 713/100 |
| 2010/0005474 A1* | 1/2010 | Sprangle et al. | 718/104 |
| 2011/0066830 A1 | 3/2011 | Wolfe et al. | |
| 2012/0017219 A1* | 1/2012 | Hsieh | G06F 9/5088 718/104 |
| 2012/0162234 A1* | 6/2012 | Blinzer et al. | 345/501 |

OTHER PUBLICATIONS

PCT Notification concerning Transmittal of International Preliminary Report on Patentability (Chapter I of the Patent Cooperation Treaty) for PCT Counterpart Application No. PCT/US2011/067778, 6 pgs., (Jul. 10, 2014).

Theofanis Constantinou et ai, Performance Implications of Single Thread Migration on a Chip Multi-Core, CM SIGARCH Computer Architecture News—Special issue: dasCMP'05, pp. 80-91, vol. 33 Issue 4, Nov. 30, 2005.

Office action and Search Report with English translation from Taiwan patent application No. 101149298, mailed Sep. 3, 2014, 26 pages.

Decision on Rejection with English translation from Taiwan patent application No. 101149298, mailed Jun. 26, 2015, 7 pages.

* cited by examiner

MIGRATING THREADS BETWEEN ASYMMETRIC CORES IN A MULTIPLE CORE PROCESSOR

CROSS-REFERENCE TO RELATED APPLICATION

This patent application is a U.S. National Phase Application under 35 U.S.C. §371 of International Application No. PCT/US2011/067778, filed Dec. 29, 2011, entitled MIGRATING THREADS BETWEEN ASYMMETRIC CORES IN A MULTIPLE CORE PROCESSOR.

TECHNICAL FIELD

Some embodiments of the invention generally relate to the operation of processors. More particularly, some embodiments of the invention relate to migrating threads between asymmetric cores in a multiple core processor.

BACKGROUND

A processor may have multiple cores ("multicore") in which each core has similar characteristics to the other cores. For example, each of the multiple cores may be capable of executing the same set of instructions, may operate at a similar or same clock frequency, may consume a similar amount of power, and the like. This type of multicore processor may be referred to as a symmetric processor. A symmetric multicore processor may be useful for distributing multiple threads amongst the multiple cores. However, the symmetric multicore processor may be constrained by the characteristics associated with each of the multiple cores, such as the clock frequency.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Figure 1:
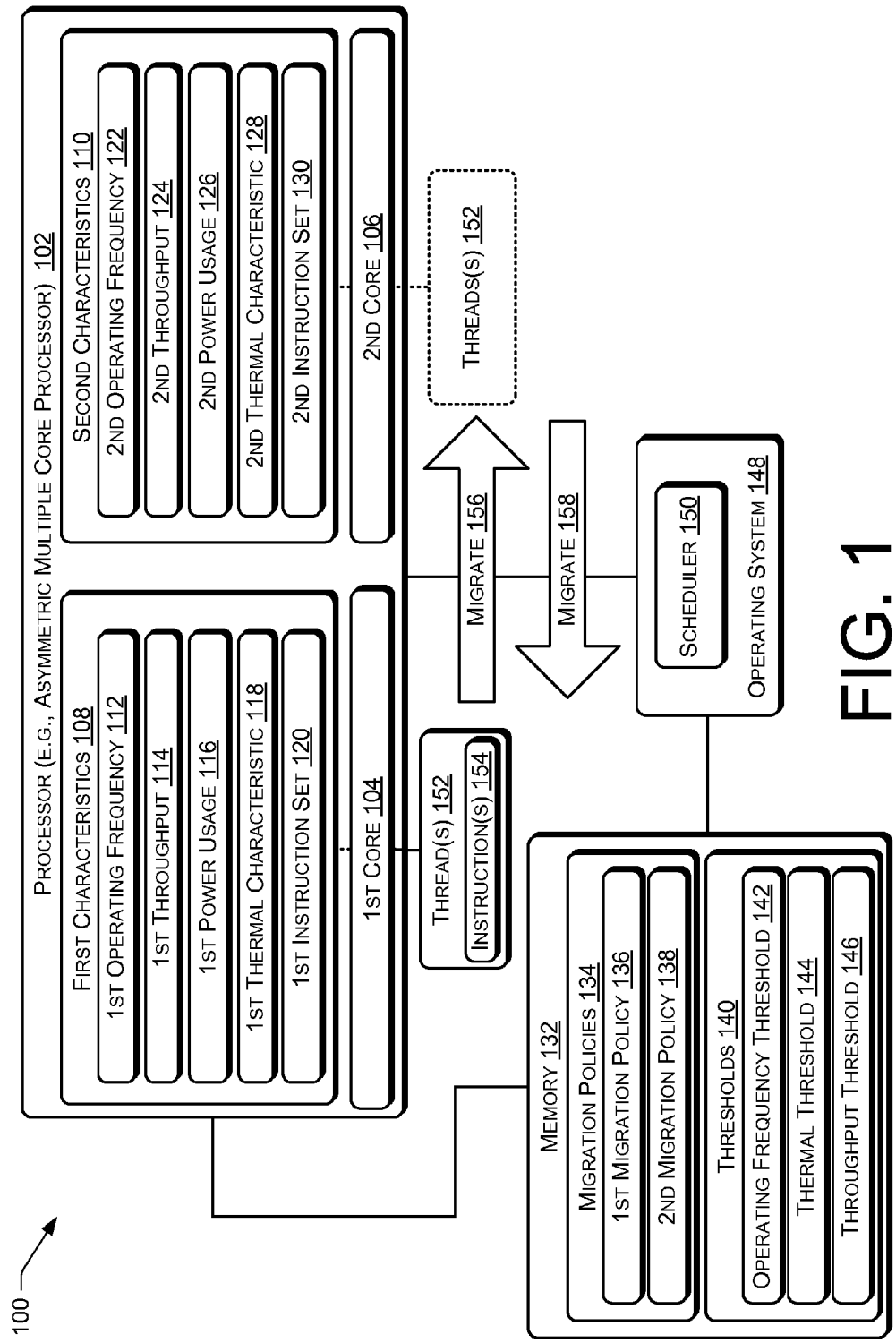
FIG. 1 illustrates an example framework to enable migrating threads in an asymmetric multiple core processor based on a migration policy according to some implementations.

The technologies described herein generally relate to a processor with asymmetric multiple cores. The processor is asymmetric because one or more cores of the multiple cores of the processor have at least one characteristic that is different from the other cores of the processor. For example, the one or more cores may differ from the other cores based on an operating frequency, a power usage, a thermal characteristic, an instruction set, another core characteristic, or any combination thereof. To illustrate, the one or more cores may be capable of operating at a faster clock speed than the other cores. As another illustration, the one or more cores may be capable of executing at least one multimedia instruction that the other cores are incapable of executing. A processor with multiple asymmetric cores may also be referred to as a heterogeneous processor.

The processor may include migration policies that identify conditions that, when satisfied, cause the processor to migrate threads from one core of a processor to another core of the processor. A thread is the smallest unit of processing that an operating system may schedule for execution on a core. For example, the processor may identify that threads scheduled for execution by a first core operating at a first frequency may be executed faster at a second core that is operating at a second frequency that is faster than the first frequency. Based on a particular policy, the processor may then migrate the one or more threads from the first core to the second core.

To illustrate, a processor in a mobile device, such as a wireless phone or tablet computing device, may include at least a first core and a second core. Compared to the second core, the first core may run at a different (e.g., slower) operating frequency, have a different (e.g., smaller) instruction set, have a different (e.g., lower) throughput, have a different (e.g., lower) power usage, or any combination thereof. The processor may schedule threads for execution by the first core to reduce power usage and thereby prolong battery life. The processor may determine that the threads scheduled for execution by the first core include particular instructions that are not supported by the first core or that the second core would execute faster than the first core. In response to the determination, the processor may migrate the threads from the first core to the second core. In some instances, after the particular instructions have been executed by the second core, the processor may migrate the threads from the second core to the first core to reduce power usage.

An asymmetric processor may be designed with more than two cores. For example, in some implementations, the asymmetric processor may include multiple cores of a first type (e.g., low power usage cores) and fewer cores of a second type of core (e.g., a single high performance, higher power usage core). In these types of implementations, the processor may use the multiple cores of the first type for multitasking threads (e.g., load balancing threads that can execute in parallel) and migrate particular threads to the second type of core when the particular threads include instructions that are unsupported or that can be executed substantially faster by the second type of core. Other implementations may include multiple cores of a first type (e.g., low power usage cores), fewer cores of a second type (e.g., a single high performance, higher power usage, general purpose core), and fewer cores of a third type (e.g., a single high performance special purpose core, such as a multimedia core). In these types of implementations, the processor may use the multiple cores of the first type for multitasking threads and may migrate particular threads to the second type of core when the particular threads include instructions that can execute substantially faster by the second type of core and may migrate particular threads to the third type of core when the particular threads include instructions (e.g., multimedia instructions) that can be executed by the third type of core but not by the first and second type of core.

Thus, an asymmetric processor with at least two different types of cores may offer numerous advantages over a symmetric processor. For example, the asymmetric processor may use less power than a symmetric processor with identical cores that are higher power usage and higher performance cores but may provide better performance than a symmetric processor with identical cores that are lower power usage and lower performance cores.

FIG. 1 illustrates an example framework 100 to enable migrating threads in an asymmetric multiple core processor based on a migration policy according to some implementations. The framework 100 includes a processor 102 with multiple asymmetric cores, such as a first core 104 and a second 106. The first core 104 may have an associated set of first characteristics 108. The second core 106 may have an associated set of second characteristics 110. The first set of characteristics 108 may include one or more characteristics, such as a first operating frequency 112, a first throughput 114 (e.g., an average number of instructions executed per second), a first power usage 116, first thermal characteristics 118, a first instruction set 120, another characteristic associated with the first core 102, or any combination thereof. The second set of characteristics 110 may include one or more characteristics, such as a second operating frequency 122, a second throughput 124 (e.g., an average number of instructions executed per second), a second power usage 126, second thermal characteristics 128, a second instruction set 130, another characteristic associated with the second core 104, or any combination thereof.

The operating frequency 112 or 122 may identify a minimum operating frequency, a maximum operating frequency, a range of operating frequencies, another operating frequency-related characteristic associated with a core, or any combination thereof. The power usage 116 may identify an amount of electrical power that the core 104 is utilizing at a particular point in time and the power usage 126 may identify an amount of electrical power that the core 106 is utilizing at a particular point in time. The thermal characteristic 118 may identify a core temperature of the core 104 at a particular time and the thermal characteristic 128 may identify a core temperature of the core 106 at a particular time.

The first instruction set 120 may include instructions to perform various functions, such as reading data, modifying data, writing data, and the like. The second instruction set 130 may include at least one particular instruction (e.g., a multimedia instruction) that the second core 106 is capable of executing but that the first core 104 is incapable of executing. The multimedia instruction may include an audio-related instruction, a video-related instruction, another type of multimedia-related instruction, or any combination thereof. In some instances, the second instruction set 130 may be a superset of the first instruction set 120, e.g., the second instruction set 130 may include all the instructions in the first instruction set 120 and at least one instruction that is not in the first instruction set 120. For example, the second core 106 may have an expanded instruction set as compared to the first core 104. In some cases, the second instruction set 130 may be completely different from the first instruction set 120, e.g., the instructions in the second instruction set 130 may exclude all the instructions from the first instructions set 120. For example, the second core 106 may be a specialized processor with a specialized instruction set, such as a graphics processor, a multimedia processor, a mathematics processor (e.g., to perform floating point operations), another type of specialized processor, or any combination thereof.

A memory 132 may be accessible to the processor 102. The memory 132 may be integrated with the processor 102 (e.g., on the same chip as the processor 102), the memory 132 may be physically distinct from the processor 102, or a combination of both (e.g., a first portion of the memory 132 may be integrated with the processor 102 while a second portion of the memory 132 may be physically distinct from the processor 102). The memory 132 may be used to store migration policies 132, such as a first migration policy 136 or a second migration policy 138. The memory 132 may be used to store thresholds 140, such as an operating frequency threshold 142, a thermal threshold 144, or a throughput threshold 146.

In operation, the migration policies 132 and/or the thresholds 140 may identify conditions that, when satisfied, cause the processor 102 to perform various actions. For example, an operating system 148 that includes a scheduler 150 may schedule one or more threads 152 for execution at the first core 104. The threads 152 may include one or more instructions 154. The processor 102 may periodically (e.g., at predetermined time intervals) monitor one or more of the first characteristics 108 associated with the first core 104 and/or one or more of the second characteristics 110 associated with the second core 106. The core processor 102 may identify particular conditions based on the threads 152, the first characteristics 108 associated with the core 104, the second characteristics 110 associated with the second core 106, or any combination thereof. For example, the core processor 102 may determine whether the first core 104 is capable of executing the instructions 154, determine a core temperature of the first core 104, and other characteristics of the cores 104 or 106. The processor 102 may determine whether to apply one of the migration policies 132 based on the particular conditions. For example, the processor 102 may determine to apply the first migration policy 136 based at least partially on the particular conditions and may migrate 156 (e.g., initiate migration) the threads 152 from one core (e.g., the first core 104) to another core (e.g., the second core 106) in the processor 102.

In some cases, one of the migration policies 132 may instruct the processor 102 to migrate 156 the threads in response to determining that the first thermal characteristic 118 associated with the first core 104 satisfies the thermal threshold 144 and the second thermal characteristic 128 associated with the second core 106 does not satisfy the thermal threshold 144. For example, executing the threads 152 at the first core 104 may cause the first thermal characteristic 118, such as a temperature associated with the first core 104, to change. To illustrate, the instructions 154 may include computationally intensive instructions that cause the temperature of the first core 104 to increase to near a maximum operational temperature of the first core 104. When the first thermal characteristic 118 satisfies the thermal threshold 144 and the second thermal characteristic 128 does not satisfy the thermal threshold 144, the processor 102 may apply the first migration policy 136. The first migration policy 136 may instruct the processor 102 to migrate 156 the threads 152 from the first core 104 to the second core 104. For example, the second core 104 may be capable of executing the computationally intensive instructions without causing a significant change to the second thermal characteristic 128. After migrating the threads 152 to the second core 106, the processor 102 may continue to periodically monitor the characteristics 108 and 110.

At a later point in time, the processor 102 may determine that the second migration policy 138 applies. For example, the processor 102 may determine that the first thermal characteristic 118 indicates that the temperature of the first core 104 has lowered and no longer satisfies the temperature threshold 144. The processor 102 may also determine that the threads 152, currently executed by the second core 106, do not include the computationally intensive instructions (e.g., the second core 106 has completed executing the computationally intensive instructions 154 of the threads 152). For example, the processor 102 may determine that one or more instruction pipelines of the second core 106 include only non-computationally intensive instructions. The processor 102 may then determine that the second migration policy 138 applies and migrate 158 the threads 152 from the second core 106 to another core (e.g., the first core 104). Thus, when the first thermal characteristic 118 of the first core 104 satisfy the thermal threshold 144 and/or the second thermal characteristic 128 does not satisfy the thermal threshold 114, the processor 102 may migrate 156 the threads 152 from the first core 104 to the second core 106. Later, when the temperature of the first core 104 does not satisfy the thermal threshold 144, the processor 102 may migrate 158 the threads 152 from the second core 106 to another core (e.g., the first core 104 or another core with similar or identical characteristics). For example, the processor 102 may migrate 158 the threads 152 to a third core that has characteristics similar or identical to the first core 104. In addition, the threads 152 may later migrate to the first core 104, the second core 106, or another core of the processor 102.

In some implementations, one of the migration policies 132 may cause the processor to migrate 156 the threads 152 in response to determining that the first throughput characteristic 114 associated with the first core 104 does not satisfy the throughput threshold. 146 and the second throughput characteristic 124 associated with the second core 106 satisfies the throughput threshold 146. For example, the processor 102 may determine, that the first throughput 114 (e.g., a number of instructions executed per second) of the first core 104 is less than the second throughput 124 of the second core 106. The processor 102 may determine (e.g., based on examining an instruction pipeline of the first core 104) that the instructions 154 are computationally intensive instructions that the second core 106 is capable of executing faster than the first core 104. The processor 102 may then determine that the first migration policy 136 applies. The first migration policy 136 may instruct the processor 102 to migrate 156 the threads 152 from the first core 104 to the second core 106 when particular conditions are satisfied. For example, the first migration policy 136 may specify that when the threads 152 are scheduled for execution at the first core 104 and include computationally intensive instructions, and the second throughput 124 satisfies the throughput threshold 146 but the first throughput 114 does not satisfy the throughput threshold 146, the processor 102 may migrate 156 the threads 152 from the first core 104 to the second core 106. After the computationally intensive instructions of the threads 152 have been executed by the second core, the processor 102 may determine that the second migration policy 138 applies. For example, the second migration policy 138 may specify that when. The threads 152 are scheduled for execution at the second core 106 and do not include computationally intensive instructions, the processor 102 may migrate 158 the threads 152 from the second core 106 to another core (e.g., the first core 104 or another core with similar or identical characteristics).

Thus, when the second core 106 is capable of executing the instructions 154 (e.g., when the instructions 154 include computationally intensive instructions) at a rate that satisfies the throughput threshold 146 and/or the first core 104 is incapable of executing the instructions 154 at a rate that satisfies the throughput threshold 146, the processor 102 may migrate 156 the threads 152 from the first core 104 to the second core 106. At a later point in time, after the second core 106 has completed executing the instructions 154 of the threads 152, the processor 102 may migrate 158 the threads 152 from the second core 106 to another core (e.g., the first core 104 or a third core with similar or identical characteristics to the first core 104).

In some cases, one of the migration policies 132 may cause the processor to migrate 156 the threads 152 in response to determining that the first operating frequency 112 associated with the first core 104 does not satisfy the operating frequency threshold 142 and the second operating frequency 122 associated with the second core 106 satisfies the operating frequency threshold 142. For example, the threads 152 may specify that the instructions 154 are to be executed at a particular frequency that satisfies the operating frequency threshold 142. For example, the instructions 154 may cause multimedia content (e.g., audio content and video content), such as a real-time video chat screen, to be displayed. The scheduler 150 may schedule the threads 152 for execution by the first core 104. The processor 102 may determine that the first operating frequency 112 of the first core 104 does not satisfy the operating frequency threshold 142 but that the second operating frequency 112 of the second core 106 satisfies the operating frequency threshold 142. The processor 102 may determine, based on one or more of the instructions 154, the first operating frequency 112, the second operating frequency 122, and the operating frequency threshold 142, that the first migration policy 136 applies and migrate 156 the threads 152 from the first core 104 to the second core 106. The processor 102 may continue to monitor the characteristics 108 and 110. After the second core 106 has completed executing the instructions 154, the processor 102 may determine that the second migration policy 138 applies (e.g., the threads 152 do not specify execution of the instructions 154 at the operating frequency threshold 142) and migrate 158 the threads 152 from the second core 106 to another core (e.g., the first core 104 or another core that is similar or equivalent to the first core 104). For example, the processor 102 may migrate 158 the threads 152 to a third core that has characteristics similar to the characteristics 108 associated with the first core 104.

In some instances, one of the migration policies 132 may cause the processor to migrate 156 the threads 152 in response to determining that the first power usage characteristic 116 associated with the first core 104 is greater than the second power usage characteristic 126 associated with the second core 106. For example, the power usage characteristic 116 of the first core 104 may be greater than the power usage characteristic 126 of the second core 106, and the processor 102 may determine that a power conservation policy applies (e.g., the amount of battery life associated with a battery may satisfy a particular threshold.). To illustrate, the processor 102 may determine that the battery of a portable computing device has less than ten percent power remaining. The processor 102 may migrate 156 the threads 152 from the first core 104 to the second core 106 to reduce the power used to execute the threads 152.

At a later point in time, the processor 102 may migrate 158 the threads 152 from the second core 106 to the first core 104. For example, after the migration, when the threads 152 are being executed by the second core 106, the processor 102 may determine that the power conservation policy does not apply (e.g., the battery of the portable computing device is being recharged), the instructions 154 include computationally intensive instructions, the instructions 154 include an instruction that is in the first instruction set 120 but not in the second instruction set 130), or combinations thereof. The processor 102 may then migrate 158 the threads 152 from the second core 106 to the first core 104. Thus, the processor 102 may migrate 156 the threads 152 from the first core 104 to the second core 106 when the first power usage 116 is greater than the second power usage 126 and a power conservation policy (e.g., one of the migration policies 132) applies. At a later point in time, the processor 102 may migrate 158 the threads 152 from the second core 106 to another core (e.g., the first core 104 or another core with similar characteristics) in response to determining that the power conservation policy no longer applies, another one of the migration policies 132 applies, or both. For example, the processor 102 may migrate 158 the threads 152 to a third core that has characteristics similar or identical to the first core 104.

One of the migration policies 132 may cause the processor to migrate 156 the threads 152 in response to determining that the first instruction set 120 does not include a particular instruction and the second instruction set 130 includes the particular instruction. For example, the second core 106 may be capable of executing at least one instruction that the first core 104 is incapable of executing. To illustrate, the second core 106 may be an advanced and/or newer version of the first core 104 such that the second instruction set 130 may include the first instruction set 120 and at least one instruction that is not in the first instruction set 120. As another illustration, the second core 106 may be capable of executing specialized instructions, such as multimedia instructions, floating point instructions, and the like. The scheduler 150 may schedule the threads 152 for execution by the first core 104. The processor 102 may determine (e.g., by examining an instruction cache of the core 104) that the first core 104 is incapable of executing one or more of the instructions 154 and that the second core 106 is capable of executing the instructions 154. For example, the processor 102 may determine that at least one of the instructions 154 is excluded from the first instruction set 120 associated with the first core 104 and is included in the second instruction set 130 associated with the second core 106. The processor 102 may determine that a migration policy 134, such as the first migration policy 136, applies. The migration policy 134 may instruct the processor 102 to migrate 156 the threads 104 from the first core 104 to the second core 106 when the threads 152 that are scheduled for execution by the first core 104 include the particular instructions 154 that are included in the second instruction set 130 but excluded from the first instruction set 120. In some instances, after the second core 106 has completed executing the instructions 154, the processor 102 may determine that another migration policy applies and migrate 158 the threads 152 from the second core 106 to the first core 104. For example, after the instructions 152 have been executed by the second core 106, the processor 102 may determine that the remaining instructions are executable by the first processor 102 (e.g., included in the first instruction set 120) and migrate 158 the threads 152 to another core (e.g., the first core 104 or another core that has similar or equivalent characteristics). For example, the processor 102 may migrate 158 the threads 152 to a third core that has characteristics similar or identical to the first core 104.

Thus, the processor 102 may periodically monitor the characteristics 108 and 110 and the instructions 154 in the threads 152 to determine whether a particular migration policy (e.g., one of the migration policies 132) applies. In response to determining that the particular migration policy applies, the processor 102 may migrate 156 the threads 152 from a first core 104 to a second core 106 of the multiple cores in the processor 102. At a later point in time, in response to determining that the particular migration policy no longer applies, another migration policy applies, or both, the processor 102 may migrate the threads 152 from the second core 106 to another core, such as the first core 104 or a third core that has characteristics similar or identical to the characteristics 108. For example, the first core 104 may be a lower power usage and lower performance core while the second core 106 may be a higher power usage and higher performance core. In this example, the processor 102 may be capable of relatively low power usage by scheduling threads for execution by the first core 104 while offering performance on demand by migrating the threads 152 to the second core 106 as needed, based on the migration policies 132. Thus, a wireless computing device, such as a wireless phone, that incorporates the processor 102 may provide relatively lower power usage via the first core 104 but may be capable of quickly performing computationally intensive instructions or multimedia instructions via the second core 106.

Figure 2:
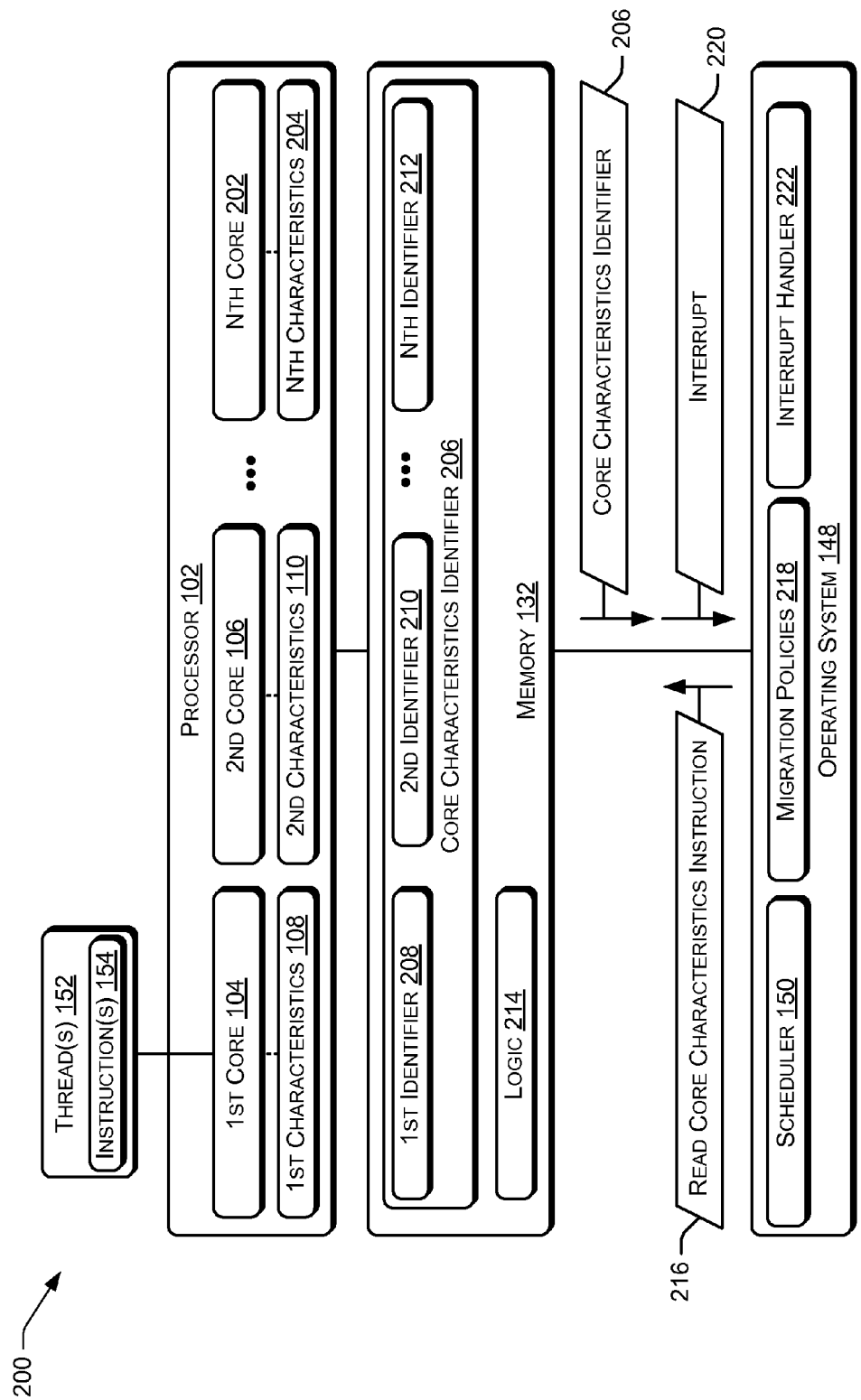
FIG. 2 illustrates an example framework to enable migrating threads in an asymmetric multiple core processor based on a core characteristics identifier according to some implementations.

FIG. 2 illustrates an example framework 200 to enable migrating threads in an asymmetric multiple core processor based on a core characteristics identifier according to some implementations. The framework 200 may include the processor 102 comprising multiple cores, including the first core 104, the second 106, and additional cores, up to an Nth core 202, where N is greater than two. Each of the cores 104, 106, and 202 may have associated characteristics. For example, the first characteristics 108 may be associated with the first core 104, the second characteristics 110 may be associated with the second core 106, and Nth characteristics 204 may be associated with the Nth core 202.

The memory 132 may be used to a store a core characteristics identifier 206 that identifies one or more characteristics of the multiple cores in the processor 102. In some implementations, the core characteristics identifier 206 may include multiple identifiers, with each identifier corresponding to a core of the processor 102. For example, a first identifier 208 may correspond to the first core 104, a second identifier 210 may correspond to the second core 106, and an Nth identifier 212 may correspond to the Nth core 202. The memory 132 may be used to store logic 214 that includes logical instructions, such as microcode or other logical instructions, that are executable by the processor 102 to perform various functions, such as, in FIG. 1, determining when to migrate 156 or migrate 158 the threads 152 from one core to another core of the processor 102.

The core characteristics identifier 206 may identify one or more characteristics of the multiple cores in the processor 102. If the operating system 148 is unaware of or incapable of accessing the core characteristics identifier 206, the processor 102 may determine when to migrate threads from one core to another core, as discussed above with reference to FIG. 1. If the operating system 148 is capable of accessing core characteristics identifier 206 to identify the characteristics of the multiple cores in the processor 102, the operating system 148 may determine when to migrate threads from one core to another core based on one or more migration policies 218. The migration policies 218 may specify conditions, that when satisfied, cause the operating system 148 to perform actions, such as migrating threads from one core to another core. The core characteristics identifier 206 may be stored in the memory 132. The core characteristics identifier 206 may identify one or more of the characteristics 108, 110, or 204 associated with the cores 104, 106, or 202. For example, the first identifier 208 may identify one or more of the first characteristics associated with the first core 104, the second identifier 210 may identify one or more of the second characteristics 110 associated with the second core 106, and the Nth identifier 212 may identify one or more of the Nth characteristics 204 associated with the Nth core 202.

The core characteristics identifier 206 may be implemented as a bit mask, a data structure, or another type of identifier. For example, when the cores 104, 106, and 202 include two types of cores, the core characteristics identifier 206 may be a bit mask in which "0" identifies a first type of core (e.g., a lower power usage and lower performance type of core) and "1" identifies a second type of core (e.g., a higher power usage and higher performance core). Thus, if N=3 and the Nth core 202 is a third core, the mask "0 0 1" (e.g., the core characteristics identifier 206) may indicate that the cores 104 and 106 are the first type of core and the Nth core 202 is the second type of core. As another example, the processor 102 may include three types of cores, such as a lower power usage type of core, a higher performance type of core, and a multimedia core. In this example, two bits may be used to identify the type of core. Thus, the mask "00 01 10" (e.g., the core characteristics identifier 206) may identify that the first core 104 is the lower power usage type of core, the second core 106 is the higher performance type of core, and the Nth core 202 is the multimedia core. Of course, other types of bit masks and/or data structures are possible to identify the characteristics 108, 110, and 204 associated with the cores 104, 106, and 202.

In addition, the identifiers 208, 210, and 212 may identify additional characteristics of the cores 104, 106, and 202, such as operating frequencies, throughput, power usage, thermal characteristics, instruction sets, other characteristics of the cores 104, 106, and 202, or combinations thereof. For example, the first identifier 208 may identify at least some of the first characteristics 108 associated with the first core 104 and the second identifier 210 may identify at least some of the second characteristics 110 of the second core 106.

In some implementations, the core characteristics identifier 206 may be static (e.g., unchanging) while in other implementations at least a portion of the core characteristics identifier 206 may be dynamically or periodically updated. For example, the characteristics 108, 110, and 204 may include a thermal (e.g., a core temperature) characteristic that is updated periodically (e.g., at a predetermined interval) or dynamically (e.g., when the thermal characteristic satisfies a particular threshold). To illustrate, the processor 102 may periodically monitor the characteristics 108, 110, and 204, such as core temperatures, associated with the cores 104, 106, and 202. When one of the characteristics 108, 110, and 204 satisfy a particular threshold, the processor 102 may update one or more of the identifiers 208, 210, or 212. For example, the processor 102 may determine that the core temperature of the first core 104 satisfies a temperature threshold and update a corresponding portion of the first identifier 208.

The operating system 148 may periodically access the core characteristics identifier 206 and determine whether one of the migration policies 218 applies. If one of the migration policies 218 applies, the operating system 148 may perform an action, such as migrating the threads 152 from one core to another core in the processor 102. For example, the operating system 148 may access the core characteristics identifier 206 (e.g., by performing a read core characteristics identifier instruction 216), determine that the core temperature characteristic associated with the first core 104 satisfies a temperature threshold, determine that one of the migration policies 132 applies, and migrate the threads 152 from the first core 104 to another core of the N cores in the processor 102.

One or more of the characteristics 108, 110, or 204 may identify a capacity or load associated with the cores 104, 106, or 202. To illustrate, the processor 102 may periodically or dynamically update one of the identifiers 208, 210, or 212 to indicate that the associated core is executing M threads (where M is greater than or equal to zero), whether the associated core is executing computationally intensive instructions, whether the associated core has the capacity to execute additional threads, whether the core is idle or stopped, and/or other core capacity related characteristics. The operating system 148 may periodically access the core characteristics identifier 206 and perform an action, such as migrating the threads 152 from one core to another core in the processor 102, based at least in part on the core characteristics identifier 206. For example, when the core temperature associated with the first core 104 satisfies a temperature threshold, the operating system 148 may identify which of the remaining cores (e.g., the cores 106 and 202) in the processor 102 have sufficient capacity to execute the threads 152 before migrating the threads 152 to one of the remaining cores.

In some cases, the operating system 148 may be unaware or incapable of accessing the core characteristics identifier 206. In these cases, the processor 102 may generate an interrupt 220 to cause the operating system to migrate the threads 152. For example, the scheduler 150 may schedule the threads 152 for execution by the first core 104. The processor 102 may determine that the first core 104 is incapable of executing at least one of the instructions 154 (e.g., the first instruction set 120 does not include at least one of the instructions 154) and generate the interrupt 220. An interrupt handler 222 associated with the operating system 148 may receive the interrupt 220 generated by the processor 102. The interrupt handler 222 may migrate the threads 152 based on information include in the interrupt 220, the migration policies 218, or both. For example, in a processor with two cores, such as the processor 102 depicted in FIG. 1, the interrupt handler 222 may migrate the threads 152 from the first core 104 to the second core 106 in response to receiving the interrupt 220. In this example, the migration policy may specify "when an interrupt occurs, migrate threads from the core at which they are scheduled to be executed to the other core." As another example, in a processor with two types of cores (e.g., a first type of core and a second type of core), the operating system 148 may determine that the threads are scheduled to be executed by the first type of core and migrate the threads to the second type of core.

In some instances, the interrupt 220 may instruct the interrupt handler 222 to migrate the threads 152 to a particular type of core. For example, if the instructions 154 are computationally intensive, the interrupt 220 may instruct the interrupt handler 222 to migrate the threads 152 to a core that is faster or more powerful (e.g., greater throughput). If the instructions 154 include specialized instructions, such as multimedia instructions, the interrupt handler 222 may instruct the interrupt handler 222 to migrate the threads 152 to a multimedia type of core. The interrupt 220 may include at least a portion of the core characteristics identifier 206. In some implementations, the processor 102 may generate the interrupt 220 to instruct the operating system 148 that a power conservation policy is in effect (e.g., battery life of a mobile device has dropped below a particular power threshold). In response to receiving the interrupt, the operating system 148 may migrate the threads 152 to a core that has a lower power usage.

Thus, the processor 102 may assist the operating system 148 in determining when the operating system 148 should migrate threads from one core to another core of the processor 102. The processor 102 may provide information about the characteristics 108, 110, and 204 of the cores 104, 106, and 202 to the operating system 148 via an identifier, such as the core characteristics identifier 206. The processor 102 may periodically monitor the characteristics 108, 110, or 204 and periodically or dynamically (e.g., in response to a particular characteristic satisfying a predetermined threshold) update one or more of the identifiers 208, 210, or 212 based on the characteristics 108, 110, or 204.

In some implementations, the operating system 148 may use the read core characteristics instruction 216 to read the contents of the core characteristics identifier 206. The operating system 148 may determine whether to apply one of the migration policies 218 based on the core characteristics identifier 206. The operating system 148 may apply one of the migration policies 218 and migrate the threads 152 based on the core characteristics identifier 206, the migration policies 218, or both. If the operating system 148 is unaware or incapable of reading the core characteristics identifier 206, the processor 102 may generate the interrupt 220. The interrupt 220 may include enough information to enable the operating system 148 to migrate threads from one core to another. For example, the interrupt 220 may include at least a portion of the core characteristics identifier 206.

In this way, the processor 102 is capable of working with a wide variety of operating systems, such as an operating system that is capable of reading the core characteristics identifier 206 as well as operating systems that are unaware or incapable of reading the core characteristics identifier 206. Based on the capabilities of the operating system 148, the processor 102 may migrate threads from one core to another core, update the core characteristics identifier 206 to enable the operating system 148 to determine when to migrate the threads, generate the interrupt 220 to instruct the operating system 148 to migrate the threads, or any combination thereof.

Figure 3:
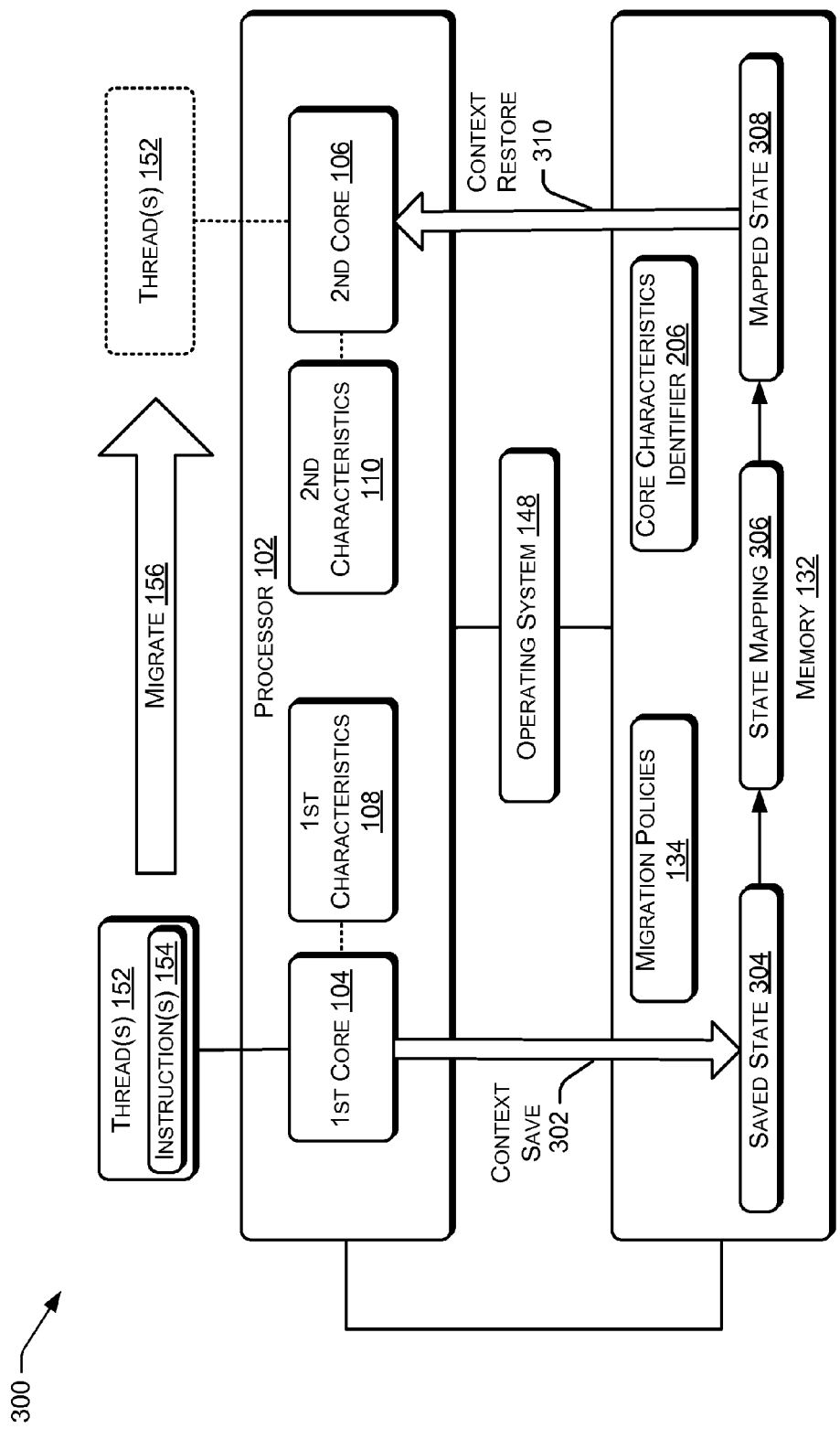
FIG. 3 illustrates a first example of a framework for migrating threads according to some implementations.

FIG. 3 illustrates a first example of a framework 300 for migrating threads according to some implementations. The framework 300 illustrates how threads may migrate from one core to another core in an asymmetric multiple core processor.

The threads 152 may be scheduled for execution by the first core 104. The processor 102 or the operating system 148 may determine to migrate 156 the threads 152 (e.g., initiate migration of the threads 152) from the first core 104 to the second core 106 based on the instructions 154, the first characteristics 108, the second characteristics 110, the migration policies 132, the core characteristics identifier 206, or any combination thereof.

Accordingly, the first core 104 may be instructed to stop executing the threads 152. After the first core 104 has stopped, a context save 302 may be performed to create a saved state 304 associated with the first core 104. The saved state 304 may include a snapshot of a state of the first core 104, such as contents of pipelines, caches, buffers, and the like associated with the first core 104. If the second core 106 is a different type of core than the first core 104 (e.g., at least one of the second characteristics 110 differs from the first characteristics 108), then a state mapping 306 may be used to map the saved state 304 of the first core 104 to a mapped state 308 that is suitable for execution by the second core 106.

The state mapping 306 may map the contents of the saved state 304 to corresponding contents associated with a state of the second core 106. For example, the first core 104 may be a 32-bit processor while the second core may be a 64-bit processor. In this example, the state mapping 306 may modify at least some of the contents of the saved state 304 by converting 32-bit memory addresses to 64-bit memory addresses, converting 32-bit instructions to 64-bit instructions, and performing other 32-bit to 64-bit mappings. The state mapping 306 may perform other mappings of the saved state 304, as appropriate, to enable the second core 106 to execute the threads 152 using the mapped state 308 with little or no impact on the execution of threads 152. After the state mapping 306 is used to create the mapped state 308, the second core 106 may be stopped if it is executing and a context restore 310 may be performed to load the mapped state 308 into the second core 106. If the second core 106 was executing threads before it was stopped, a context save operation may be performed to save a state of the second core 106, and the mapped state 308 may be merged or joined with the saved state of the second core 106 before the context restore 310 is performed (e.g., threads executing on the second core 106 prior to the migration are not significantly impacted by the migration of the threads 152 to the second core 106). After the context restore 310 has completed, the second core 106 may be instructed to execute the threads 152 using the mapped state 308. Thus, after the migrate 156 of the threads 152 to the second core 106, the threads 152 may resume execution by the second core 106.

The migration of the threads 152 from the first core 104 to the second core 106 may be transparent to a user of a computing device that includes the processor 102. For example, the user may notice little or no interruption of the tasks performed by the threads 152. The computing device that includes the processor 102 may function in a way that the user is unaware that the threads 152 were migrated from one core to another core of the processor 102.

If the second core 106 has similar or identical characteristics 110 to the first core 104, the state mapping 306 may not be performed. Instead, the saved state 304 may be used as the mapped state 308. For example, the second core 106 may be a newer or improved version of the first core 104 with a similar or identical architecture as compared to the first core 104. Under such circumstances, the state mapping 306 may not be performed. To illustrate, if the second core 106 has a faster operating frequency than the first core 104, but has the same or similar architecture as the first core 104, then the state mapping 306 may not be performed. As another illustration, if the second core 106 has an instruction set that includes an instruction set of the first core 104, but has the same or similar architecture as the first core 104, then the state mapping 306 may not be performed.

Thus, when a migration of threads from a first core (e.g., the first core 104) to a second core (e.g., the second core 106) is initiated, the first core may be stopped and the context save 302 may be performed to create the saved state 304. If the second core has sufficiently different characteristics from the first core, the state mapping 306 may be performed to create the mapped state 308 based on the saved state 304. The second core may be stopped and the mapped state 308 may be loaded into the second core 106 using the context restore 310. After the context restore 310 has completed, the second core may be instructed to execute the threads 152 based on the mapped state 308. If the second core has similar or identical characteristics to the first core such that the state mapping 306 is not performed, the saved state 304 may be used as the mapped state 308 for the context restore 310. In this way, threads may be migrated seamlessly and transparently from one core to another core of the processor 102 with little or no disruption/impact to the threads 152. The threads 152 may migrate 156 from one core to another core without a user becoming aware that execution of the threads 152 was interrupted. For example, the migration may not cause any noticeable degradation in the performance of the execution of the threads 152, the processor 102, and the computing device. To the contrary, the user may notice that tasks performed by the threads 152 are executing faster or that multimedia operations are being performed. For example, in some implementations, the entire migrate 156 operation may occur in less than forty microseconds.

Figure 4:
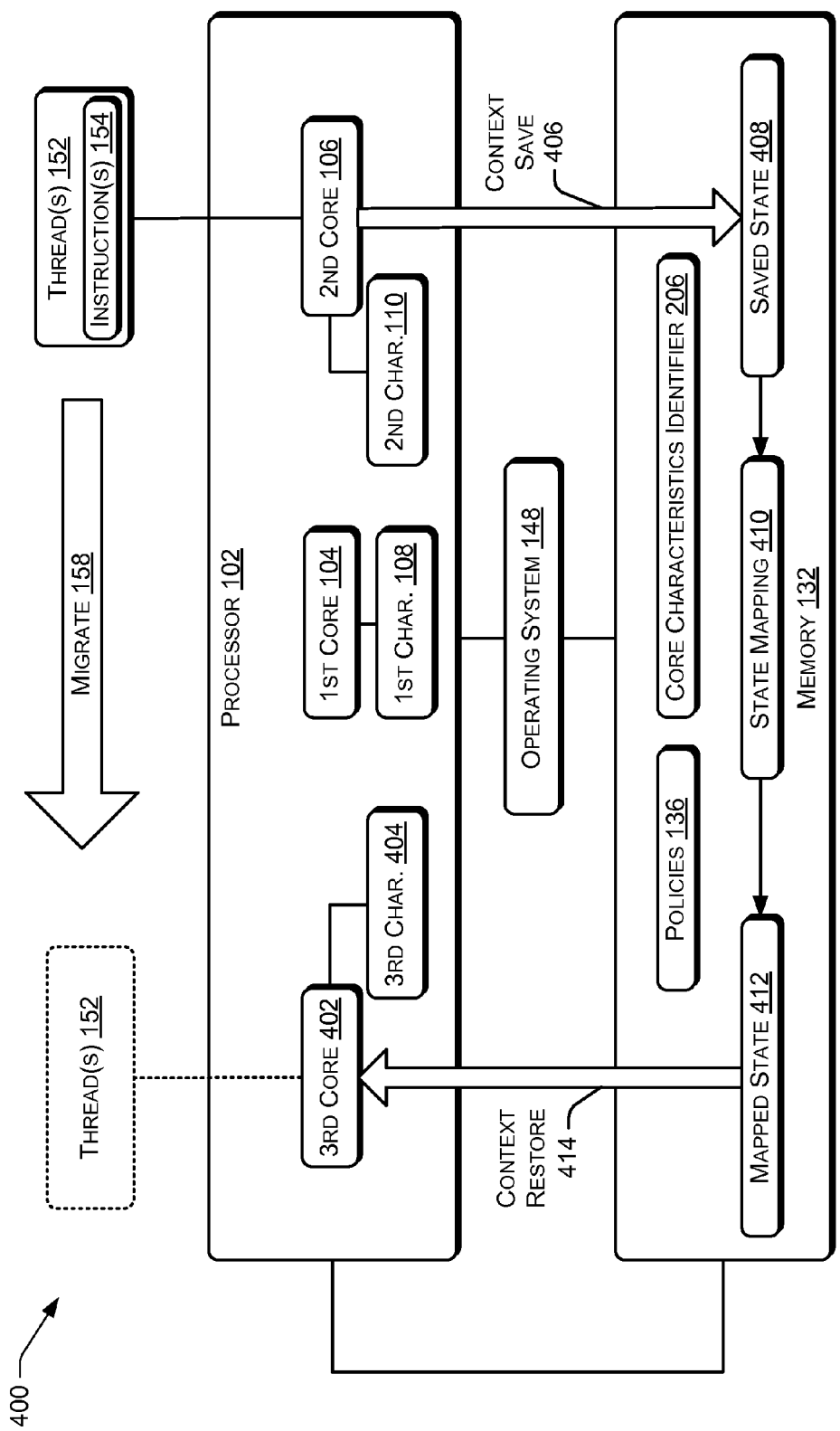
FIG. 4 illustrates a second example of a framework for migrating threads according to some implementations.

FIG. 4 illustrates a second example of a framework 400 for migrating threads according to some implementations. The framework 400 illustrates how threads, after migrating from a first core to a second core may migrate back to another core. The processor 102 may include the first core 104, the second core 106, and a third core 402. Third characteristics 404 may be associated with the third core 402.

In some instances, after the threads 152 have migrated from the first core 104 to the second core 106 as described above with reference to FIG. 3, a determination may be made to initiate migration of the threads 152 from the second core 106 to another core, such as the first core 104 or the third core 402. For example, after the second core 106 completes execution of the instructions 154, the processor 102 or the operating system 148 may determine that the threads 152 may be executed by another core of the processor 102. For example, the second core 106 may have relatively higher power usage compared to other cores, such as the cores 104 or 402. The processor 102 or the operating system 148 may determine to apply a policy, such as a power conservation policy. To reduce power usage associated with executing the threads 152, the processor 102 or the operating system 148 may migrate 158 the threads 152 from the second core 106 to another core (e.g., the third core 402 or the first core 104) of the processor 102 that uses less power than the second core 106.

Accordingly, the second core 106 may be instructed to stop execution of the threads 152. A context save 406 may be performed to create a saved state 408 associated with the second core 106. A state mapping 410 may be performed to create a mapped state 412 for the destination core (e.g., the third core 402 or the first core 104). A context restore 414 may be performed to provide the mapped state 414 to the destination core. For example, in FIG. 4, the context restore 414 may be used to provide the mapped state 414 to the third core 402. The third core 402 may execute the threads 152 based on the mapped state 412.

Of course, other situations may occur in which the processor 102 or the operating system 148 first migrates the threads 152 from the first core 104 to the second core 106 and then migrates the threads 152 from the second core 106 to the third core 402. For example, the first core 104 may be a low power usage, low performance core, the second core 106 may be a high power usage, high performance core, and the third core 402 may be a specialized core, such as a multimedia core. Initially, the threads 152 may be executed by the first core 104 to conserve power usage. The instructions 152 may include computationally intensive instructions that cause the core temperature of the first core 104 to increase such that it satisfies the thermal threshold 144 of FIG. 1. The threads 152 may be migrated from the first core 104 to the second core 106 to enable the core temperature of the first core 104 to decrease. The second core 106 may be capable of executing the threads 152 without adversely affecting the core temperature of the second core 106. After the migration, the second core 106 may execute the threads 152. The threads 152 may include specialized instructions (e.g., multimedia instructions) that the cores 104 and 106 are incapable of executing. When the specialized instructions of the threads 152 are scheduled for execution by the second core, the processor 102 or the operating system 148 may migrate 158 the threads 152 from the second core 106 to a specialized core (e.g., the third core 402) that is capable of executing the specialized instructions.

Figure 5:
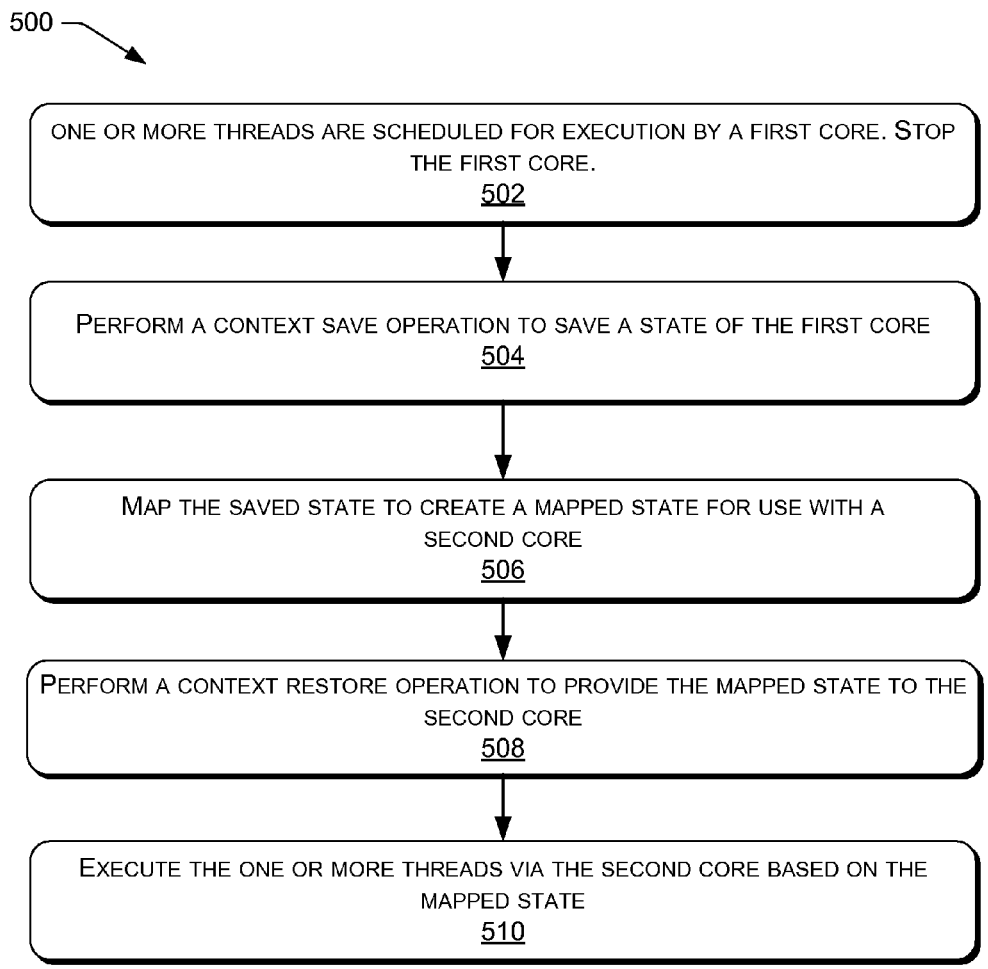
FIG. 5 illustrates a flow diagram of an example process for migrating threads according to some implementations.
Figure 6:
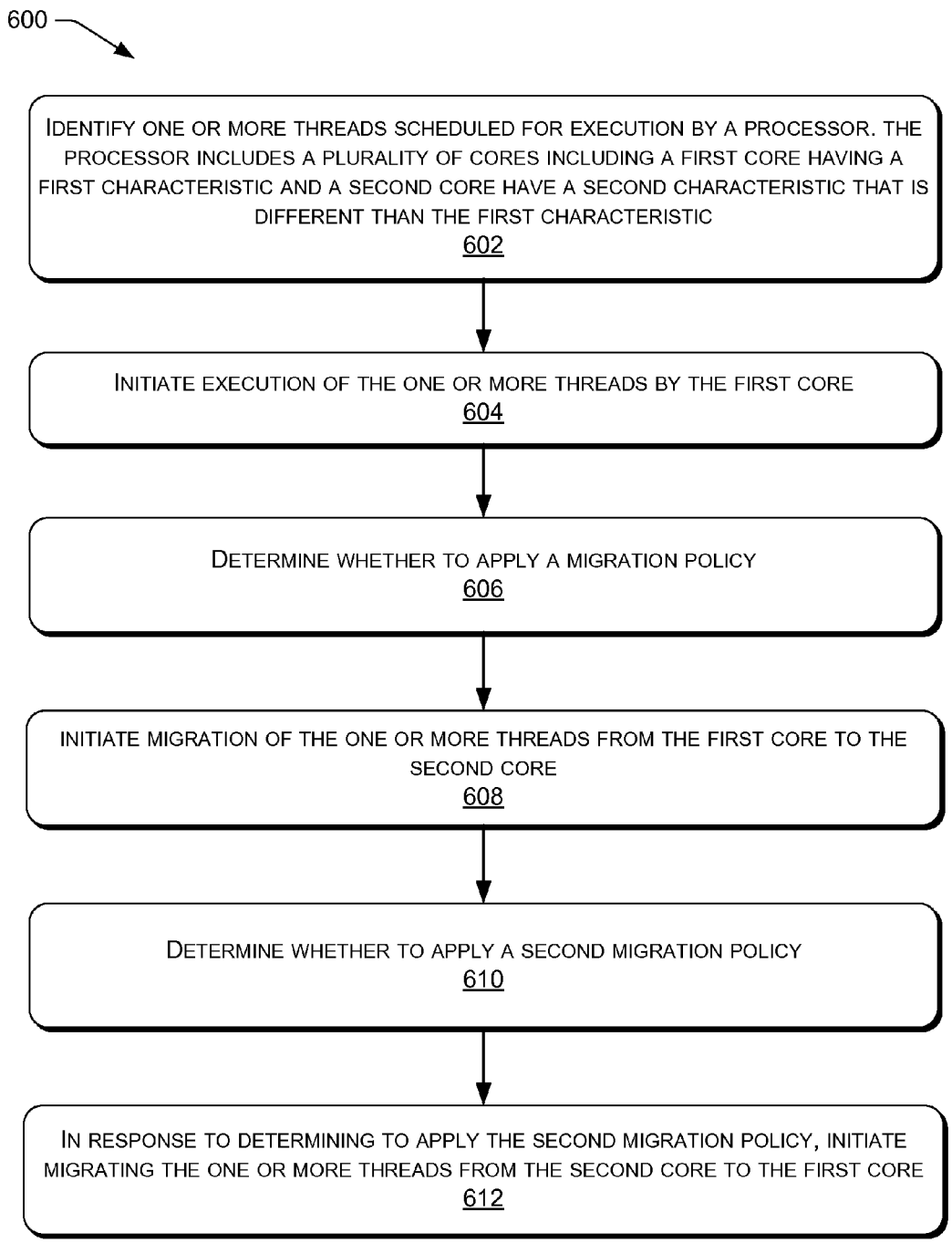
FIG. 6 illustrates a flow diagram of an example process for migrating threads based on a migration policy according to some implementations.
Figure 7:
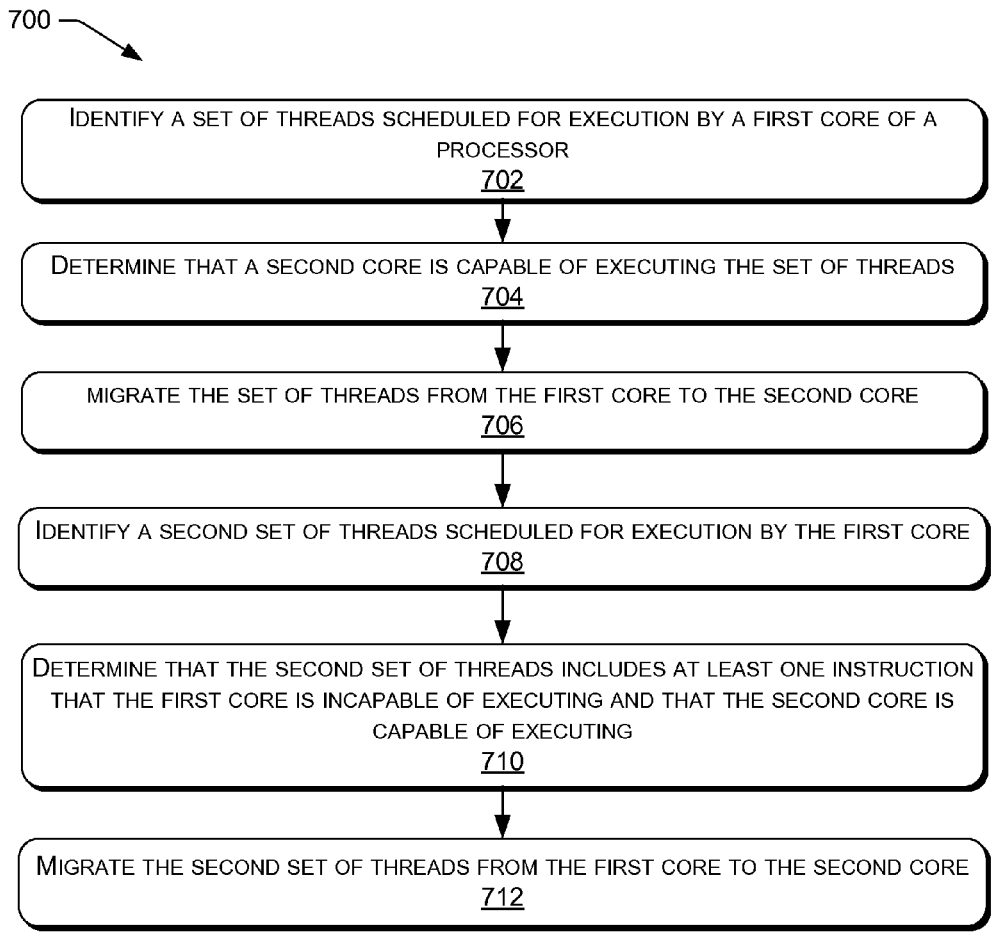
FIG. 7 illustrates a flow diagram of an example process for migrating threads based on an instruction set according to some implementations.

FIGS. 5, 6, and 7 are example processes for migrating threads according to some implementations. In the flow diagrams of FIGS. 5, 6, and 7, each block represents one or more operations that can be implemented in hardware, firmware, software, or a combination thereof. The processes described in FIGS. 5, 6, and 7 may be performed by a processor with multiple asymmetric cores, such as the processor 102. In the context of software, the blocks represent computer-executable instructions that, when executed by the processor, cause the processor to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to the frameworks 100, 200, 300, and 400 described above, although other models, frameworks, systems and environments may implement these processes.

FIG. 5 illustrates a flow diagram of an example process 500 for migrating threads according to some implementations. At block 502, one or more threads may be scheduled for (or may be executing) at the first core and the core may be stopped. For example, in FIG. 3, the processor 102 or the operating system 148 may determine to migrate 156 the threads 152 from the first core 104 to the second core 106. The migration process may include stopping the first core 104.

At block 504, a context save operation may be performed to save a state of the first core. For example, in FIG. 3, the context save 302 may create the saved state 304 associated with the first core 104. At block 506, the saved state may be mapped to create a mapped state for use with a second core. For example, in FIG. 3, the state mapping 306 may map the saved state 304 to create the mapped state 308 that is to be used with the second core 106. At block 508, a context restore operation is performed to provide the mapped state to the second core. For example, in FIG. 3, the context restore 310 provides the mapped state 308 to the second core 106. At block 510, the one or more threads are executed via the second core based on the mapped state. For example, in FIG. 3, the threads 152 are executed by the second core 106 based on the mapped state 308.

Thus, threads may be migrated from one type of core to another type of core in an asymmetric multiple core processor. Migrating the threads may enable the processor or the operating system to take advantage of the different characteristics of the different types of cores. For example, threads may be migrated to a low power usage core to conserve power, to a high performance core to improve performance or execute computationally intensive instructions, or to a specialized core (e.g., a multimedia core) to execute specialized instructions. In particular, portable computing devices with a limited amount of power (e.g., battery powered devices), such as wireless phones or tablet computing devices, may incorporate an asymmetric processor to offer relatively low power usage while providing performance on-demand (e.g., based on the requirements of the software that is being executed).

FIG. 6 illustrates a flow diagram of an example process 600 for migrating threads based on a migration policy according to some implementations. At block 602, one or more threads scheduled for execution at a processor are identified. The processor includes a plurality of cores, including a first core and a second core. The first core may have an associated first characteristic and the second core may have an associated second characteristic that is different than the first characteristic. For example, in FIG. 1, the processor 102 may have multiple cores, including the first core 104 and the second core 106. The first core 104 may have the associated first characteristics 108 and the second core 106 may have the associated second characteristics 110. At least one of the first characteristics 108 may be different than the second characteristics 110. At block 604, the processor may initiate execution of the one or more threads by the first core. For example, in FIG. 1, the scheduler 150 may schedule the threads 152 for execution by the first core 104. In response, the first core 104 may initiate execution of the threads 152.

At block 606, a determination may be made whether to apply a migration policy. The migration policy may identify a particular set of conditions that when satisfied instruct the processor to migrate the threads from one core to another core. For example, in FIG. 1, the processor 102 may determine whether to apply one of the migration policies 132 based on the characteristics 108, the characteristics 110, the instructions 154, the thresholds 140, or any combination thereof. As another example, the operating system 148 may determine whether to apply one of the migration policies 218 based on the core characteristics identifier 206, the instructions 154, various thresholds (similar to the thresholds 140 of FIG. 1), or any combination thereof. At block 608, migration of the one or more threads from the first core to the second core may be initiated. For example, as illustrated in FIG. 3, the migration of the one or more threads 152 from the first core 104 to the second core 106 may include performing the context save 302 to create the saved state 304, performing the state mapping 306 to create the mapped state 308, and executing the threads by the second core based on the mapped state 308.

Thus, threads may be migrated from one type of core to another type of core in an asymmetric multiple core processor based on a migration policy. For example, the migration policy may instruct the processor 102 to migrate the threads 152 when a power conservation policy is in effect. As yet another example, the migration policy may cause the processor 102 to migrate the threads 152 when the first core 104 is incapable of executing at least one of the instructions 154 and the second core 106 is capable of executing at least one of the instructions 154. Migrating the threads may enable the processor or the operating system to take advantage of the different characteristics of the different types of cores.

FIG. 7 illustrates a flow diagram of an example process 700 for migrating threads based on an instruction set according to some implementations. At block 702, a set of threads scheduled for execution by a first core of a processor are identified. For example, in FIG. 1, the processor 102 may identify the threads 152 as scheduled for execution by the first core 104. At block 704, a determination may be made that a second core is capable of executing the set of threads. For example, in FIG. 1, the processor 102 or the operating system 148 may determine that the second core 106 may be capable of executing the threads 152, and may be capable of executing the threads 152 faster than the first core 104 is capable of executing the threads 152 because the second core 106 has a faster execution throughput than the first core 104.

At block 706, the set of threads may be migrated from the first core to the second core. For example, in FIG. 1, the processor 102 or the operating system 148 may determine that the threads 152 include computationally intensive instructions that are causing the core temperature of the first core 104 to increase. The processor 102 or the operating system 148 may determine that the threads 152 may be executable by the second core 106. In this example, the processor 102 or the operating system 148 may migrate the threads 152 from the first core 104 to the second core 106 to enable the core temperature of the first core 104 to decrease, to enable the threads 152 to be executed by a core that has more execution throughput, or both. At block 708 a second set of threads may be identified as scheduled for execution by the first core. For example, in FIG. 1, the processor 102 may identify the threads 152 as scheduled for execution by the first core 104.

At block 710, a determination may be made that the second set of threads includes at least one instruction that the first core is incapable of executing and that the second core is capable of executing. At block 712 the second set of threads is migrated from the first core to the second core. For example, in FIG. 2, the processor 102 or the operating system 148 (e.g., via the interrupt 220) may determine that at least one of the instructions 154 in the threads 152 is not executable by the first core 104. The processor 102 or the operating system 148 may determine that another core, such as the second core 106 or the Nth core 202, is capable of executing the instructions 154. The processor 102 or the operating system 148 may migrate the threads 152 to the other core (e.g., the second core 106 or the Nth core 202).

Thus, threads may be migrated from one type of core to another type of core in an asymmetric multiple core processor. Migrating the threads may enable the processor or the operating system to take advantage of the different characteristics of the different types of cores. For example, threads may be migrated from a low power usage/low performance core to a high power usage/high performance core to improve performance or execute computationally intensive instructions. As another example, the threads may be migrated to a second core that is capable of executing particular instructions that the first core is incapable of executing.

Figure 8:
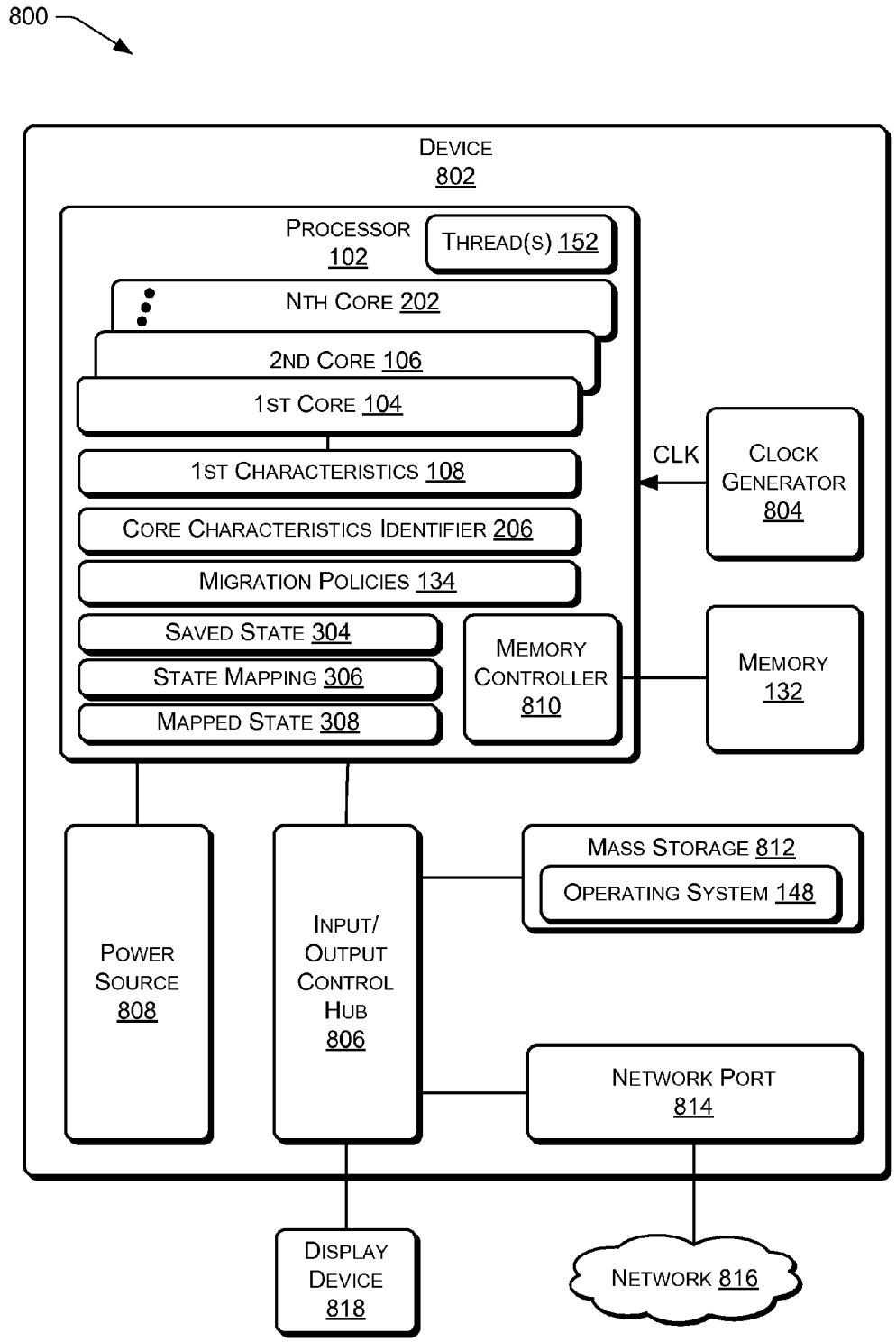
FIG. 8 illustrates an example framework that includes an asymmetric multiple core processor according to some implementations

FIG. 8 illustrates an example framework 800 that includes an asymmetric multiple core processor according to some implementations. The framework 800 includes a device 802, which may be an electronic device, such as a desktop computing device, a laptop computing device, tablet computing device, netbook computing device, wireless computing device, and the like.

The device 802 may include one or more processors, such as the processor 102, a clock generator 804, the memory 132, an input/output control hub 806, and a power source 808 (e.g., a battery or a power supply). In some implementations, at least one processor in the device 802 may include a multiple core processor, such as the processor 102. For example, the multiple core processor 102 may include more than one core, such as the first core 104, the second core 106, and, in some implementations, one or more additional cores, up to and including an $N^{th}$ core 202. The processor 102 may include a memory controller 810 to enable access (e.g., reading from or writing) to the memory 132.

Each of the N cores 104, 106, and 202 may have associated characteristics for example, the first core 104 may have the associated first characteristics 108. The core characteristics identifier 206 may identify one or more characteristics of each of the N cores of the processor 102. In some implementations, the operating system 148 may read the core characteristics identifier 206 to determine when to migrate the threads 152 from a first core to a second core of the N cores. In other implementations, where the operating system 148 is unaware or incapable of reading the core characteristics identifier 206, the processor 102 may determine when to migrate the threads 152 from the first core 104 to the second core 106. For example, the operating system 148 or the processor 102 may migrate the threads 152 from the first core 104 to the second core 106 based on the migration policies 132. During the migration, the first core 104 may be stopped and a state of the first core 104 may be saved as the first state 304. In some cases, the saved state 304 of the first core 104 may be mapped using the state mapping 306 to create the mapped state 308. The mapped state 308 may be used to resume execution of the threads 152 on the second core 106. One or more of the migration policies 132, the saved state 304, the state mapping 306, or the mapped state 308 may be stored in an on-board memory of the processor 102, in the memory 132, or a combination of both.

The clock generator 804 may generate a clock signal that is the basis for an operating frequency of one or more of the N cores of the processor 102. For example, one or more of the N cores 104, 106, or 202 may operate at a multiple of the clock signal generated by the clock generator 804.

The input/output control hub 806 may be coupled to mass storage 812. The mass storage 812 may include one or more non-volatile storage devices, such as disk drives, solid state drives, and the like. The operating system 148 may be stored in the mass storage 812.

The input/output control hub 806 may be coupled to a network port 814. The network port 814 may enable the device 802 to communicate with other devices via a network 816. The network 816 may include multiple networks, such as wireline networks (e.g., public switched telephone network and the like), wireless networks (e.g., 802.11, code division multiple access (CDMA), global system for mobile (GSM), Long Term Evolution (LTE) and the like), other types of communication networks, or any combination thereof. The input/output control hub 804 may be coupled to a display device 818 that is capable of displaying text, graphics, and the like.

As described herein, the processor 102 may include multiple computing units or multiple cores. The processor 102 can be implemented as one or more microprocessors, microcomputers, microcontrollers, digital signal processors, central processing units, state machines, logic circuitries, and/or any devices that manipulate signals based on operational instructions. Among other capabilities, the processor 102 can be configured to fetch and execute instructions stored in the memory 132 or other computer-readable media.

The memory 132 is an example of computer storage media for storing instructions which are executed by the processor 102 to perform the various functions described above. The memory 132 may generally include both volatile memory and non-volatile memory (e.g., RAM, ROM, or the like). The memory 132 may be referred to as memory or computer storage media herein, and may be a non-transitory media capable of storing computer-readable, processor-executable program instructions as computer program code that can be executed by the processor 102 as a particular machine configured for carrying out the operations and functions described in the implementations herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor comprising:
a plurality of cores including a first core and a second core; and
a memory to store a core characteristics identifier, the core characteristics identifier comprising a first identifier and a second identifier, the first identifier indicating first characteristics associated with the first core and the second identifier indicating second characteristics associated with the second core,
wherein the processor is to periodically monitor the first characteristics and the second characteristics and update the core characteristics identifier based on the first characteristics or the second characteristics, and further the processor generates an interrupt, in response to the processor detecting that one or more threads scheduled for execution by the first core include at least one instruction that the first core is incapable of executing, to cause an operating system to migrate the one or more threads from the first core to the second core according to a migration policy of a plurality of migration policies determined to apply based on the core characteristics identifier.

2. The processor as recited in claim 1, wherein the core characteristics identifier is modified by the processor in response to the processor detecting a change in the first characteristics or the second characteristics.

3. The processor as recited in claim 1, wherein:
the processor provides the core characteristics identifier to the operating system in response to a read core characteristics instruction; and
the one or more threads are migrated from the first core to the second core based on the core characteristics identifier.

4. The processor of claim 1, wherein the first core and the second core are asymmetric cores.

5. A method performed by a hardware processor, the method comprising:
identifying one or more threads scheduled for execution at the hardware processor, the hardware processor comprising a plurality of cores including a first core having a first identifier and a second core have a second identifier, the first identifier indicating first characteristics associated with the first core and the second identifier indicating second characteristics associated with the second core,
initiating execution of the one or more threads by the first core;
periodically monitoring the first characteristic and the second characteristic;
updating a core characteristics identifier that comprises the first identifier and the second identifier, based on the first characteristic or the second characteristic;
determining to apply a migration policy of a plurality of migration policies based on the core characteristics identifier; and
in response to determining to apply the migration policy, initiating migrating the one or more threads from the first core to the second core by generating an interrupt to be received by an interrupt service routine.

6. The method as recited in claim 5, further comprising:
stopping execution of the one or more threads by the first core;
saving a state of the first core;
mapping the state of the first core to create a mapped state for the second core;
migrating the one or more threads from the first core to the second core; and
resuming execution of the one or more threads by the second core based on the mapped state.

7. The method as recited in claim 5, further comprising:
determining whether to apply a second migration policy; and
in response to determining to apply the second migration policy, initiating migrating the one or more threads from the second core to the first core based on the second migration policy.

8. The method as recited in claim 7, further comprising:
stopping execution of the one or more threads by the second core;
saving a second state of the second core;
mapping the second state of the second core to create a second mapped state for the first core;
migrating the one or more threads to the first core; and
resuming execution of the one or more threads by the first core based on the second mapped state.

9. The method as recited in claim 5, wherein determining whether to apply the migration policy comprises:
detecting that a first thermal characteristic associated with the first core satisfies a thermal threshold; and
detecting that a second thermal characteristic associated with the second core does not satisfy the thermal threshold.

10. The method as recited in claim 5, wherein determining whether to apply the migration policy comprises:
detecting that a first throughput characteristic associated with the first core does not satisfy a throughput threshold; and
detecting that a second throughput characteristic associated with the second core satisfies the throughput threshold.

11. The method as recited in claim 5, wherein determining whether to apply the migration policy comprises:
detecting that a first operating frequency characteristic associated with the first core does not satisfy an operating frequency threshold; and
detecting that a second operating frequency characteristic associated with the second core satisfies the operating frequency threshold.

12. The method as recited in claim 5, wherein determining whether to apply the migration policy comprises detecting that a first power usage characteristic associated with the first core is greater than a second power usage characteristic associated with the second core.

13. The method of claim 5, wherein the first core and the second core are asymmetric cores.

14. The method as recited in claim 5, wherein determining whether to apply the migration policy comprises detecting that a first instruction set that the first core is capable of executing does not include at least one particular instruction and a second instruction set that the second core is capable of executing includes the at least one particular instruction.

15. A system comprising:
a processor comprising a plurality of cores including a first core and a second core;
a first memory to store a core characteristics identifier, the core characteristics identifier comprising a first identifier and a second identifier, the first identifier indicating first characteristics associated with the first core and the second identifier indicating second characteristics associated with the second core; and
a second memory to store an operating system including an interrupt handler;

and the processor executing the interrupt handler is to migrate one or more threads from the first core to the second core, according to a migration policy of a plurality of migration policies determined to apply based on the core characteristics identifier, upon receipt of a processor generated interrupt, wherein the processor generated interrupt is generated in response to the processor detecting that the one or more threads scheduled for execution by the first core include at least one instruction that the first core is incapable of executing, wherein the processor is to periodically monitors the first characteristics and the second characteristics and update the core characteristics identifier based on the first characteristics or the second characteristics.

16. The system of claim 15, wherein the first core and the second core are asymmetric cores.

* * * * *